United States Patent
Wang et al.

(10) Patent No.: US 8,375,091 B2
(45) Date of Patent: Feb. 12, 2013

(54) ELECTRONIC DEVICE WITH EMAIL FUNCTION AND METHOD FOR SETTING EMAIL ACCOUNT OF ELECTRONIC DEVICE

(75) Inventors: Chuan-Hong Wang, Taipei Hsien (TW);
Hsiao-Chung Chou, Taipei Hsien (TW);
Li-Zhang Huang, Taipei Hsien (TW);
Kuan-Hong Hsieh, Taipei Hsien (TW);
Xiao-Guang Li, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 543 days.

(21) Appl. No.: 12/434,679

(22) Filed: May 3, 2009

(65) Prior Publication Data

US 2010/0125639 A1 May 20, 2010

(30) Foreign Application Priority Data

Nov. 20, 2008 (CN) .......................... 2008 1 0305660

(51) Int. Cl.
*G06F 15/16* (2006.01)

(52) U.S. Cl. ...................................................... 709/206
(58) Field of Classification Search .................. 709/206
See application file for complete search history.

(56) References Cited

U.S. PATENT DOCUMENTS

| | | | |
|---|---|---|---|
| 2004/0254996 A1* | 12/2004 | Yabe et al. .................... | 709/206 |
| 2005/0060381 A1* | 3/2005 | Huynh et al. .................. | 709/206 |
| 2006/0021004 A1* | 1/2006 | Moran et al. .................... | 726/2 |
| 2009/0006644 A1* | 1/2009 | Forstall et al. ................ | 709/232 |
| 2009/0093242 A1* | 4/2009 | Bhalekar et al. .............. | 455/418 |

FOREIGN PATENT DOCUMENTS

WO   WO 2004017583 A1 *   2/2004

* cited by examiner

*Primary Examiner* — Wing F Chan
*Assistant Examiner* — Kostas Katsikis
(74) *Attorney, Agent, or Firm* — Altis Law Group, Inc.

(57) ABSTRACT

A method for setting account of an electronic device is provided. The method includes steps of: receiving emails; reading a received email; detecting whether parameters of the read email are consistent with a predetermined rules; setting the origination email account, which sends the read email, as an available email account of the electronic device if the parameters of the read email are consistent with the predetermined rules. The electronic device with email function is also provided.

6 Claims, 3 Drawing Sheets

ELECTRONIC DEVICE WITH EMAIL FUNCTION AND METHOD FOR SETTING EMAIL ACCOUNT OF ELECTRONIC DEVICE

BACKGROUND

1. Technical Field

The present disclosure relates to an electronic device with email function and a method for setting email account of the electronic device.

2. Description of Related Art

It is known that there are certain kinds of electronic devices that are set up to receive email by a fixed email account, but are not enabled for using other email accounts. For example, a Digital Photo Frame (DPF), may include means to receive, store, and display emails for user accounts, upcoming specials etc, but cannot be set to receive email bound for a user's personal email account. What is needed is a device and a method that will allow users to change email accounts accessed by electronic devices that don't have input means for such changes.

SUMMARY OF INVENTION

An electronic device with an email function is provided. The electronic device accesses and receives emails from a predetermined email account. The electronic device includes a storage unit and a processing unit. The storage unit is capable of storing emails. The processing unit includes an email receiving module, a reading module, a detection module and an account setting module. The email receiving module is capable of receiving emails sent from an original email account via the predetermined email account. The reading module is capable of reading the received email. The detection module is capable of detecting whether parameters of a read email are consistent with predetermined rules. The account setting module is capable of setting the original email account, which sends the read emails, as an available email account of the electronic device, if the parameters of the read email are consistent with the predetermined rules.

A method for setting an email account of the electronic device, which accesses and receives emails from a predetermined email account, is also provided. The method includes steps: receiving emails sent from an original email account; reading a received email; detecting whether parameters of a read email are consistent with predetermined rules; and setting the original email account, which sends the read email, as an available email account of the electronic device if the parameters of the read email are consistent with the predetermined rules.

Therefore, when the electronic device receives an email sent from an original email account, parameters of the received email are consistent with predetermined rules, and sets the original email account as an available email account of the electronic device, no need the user operates the electronic device manually.

DETAILED DESCRIPTION

Figure 1:
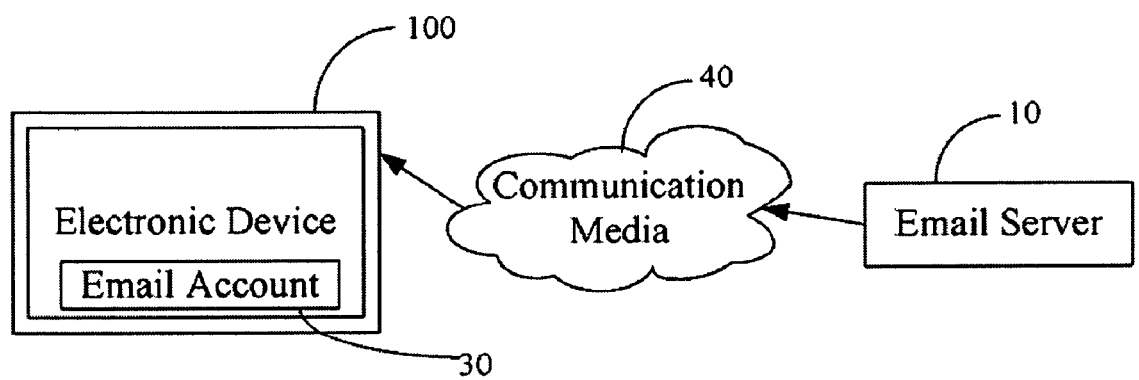
FIG. 1 is a schematic diagram of an email receiving system, including an electronic device with email function, in accordance with an exemplary embodiment.

FIG. 1 is a schematic diagram of an email receiving system, including an electronic device with email function, in accordance with an exemplary embodiment. The system includes an electronic device 100, an email server 10, and a communication media 40. The electronic device 100 includes an email program and associated memory for storage of received emails. The electronic device 100 is connected to the email server 10 via the communication media 40, for example, a network (e.g., the Internet, a local network, a local area network, or a wireless network). The electronic device 100 is initially configured to access and receive emails from a predetermined email account 30, by logging into the email server 10 via the communication media 40. The settings for the predetermined email account may be changed by a user to another email account as described below.

Figure 2:
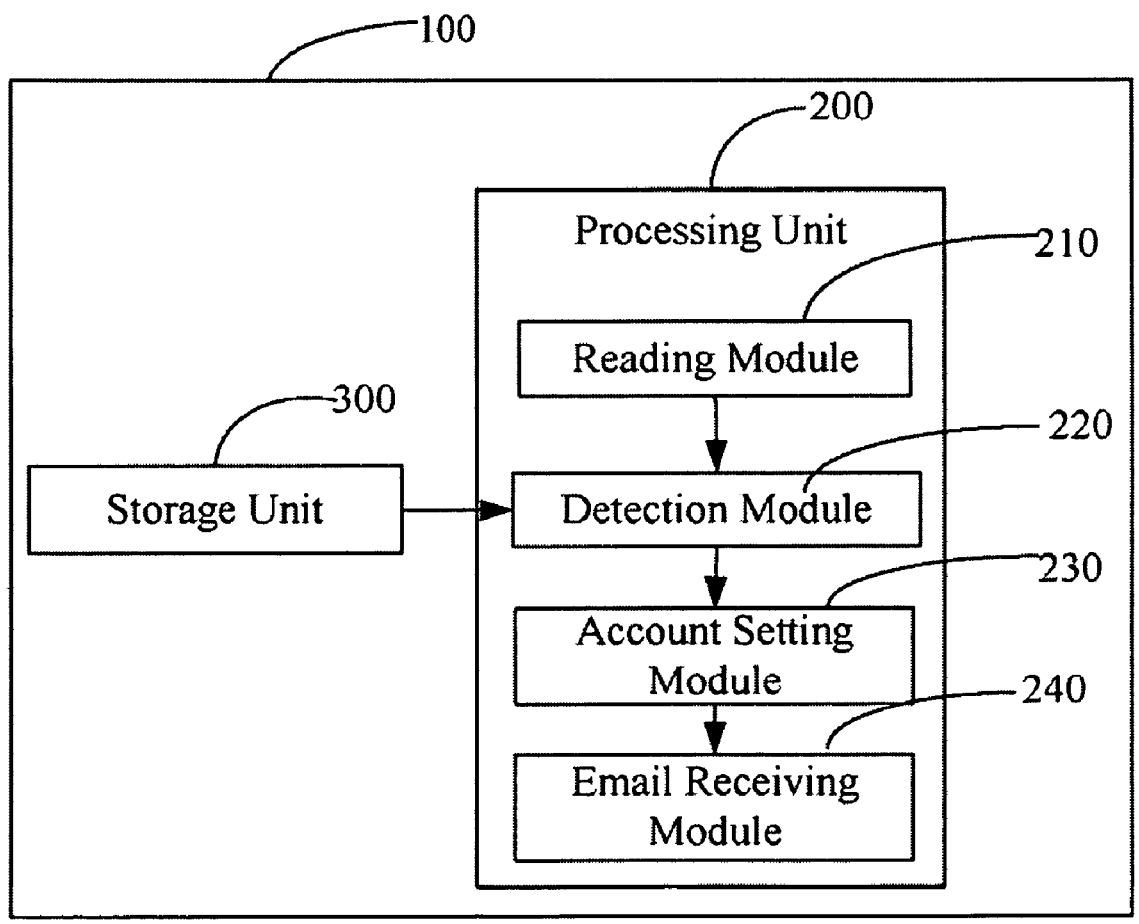
FIG. 2 is a block diagram of a hardware infrastructure of the electronic device of FIG. 1 in accordance with an exemplary embodiment.

FIG. 2 is a block diagram of a hardware infrastructure of the electronic device 100 of FIG. 1 in accordance with an exemplary embodiment. The electronic device 100 includes a processing unit 200 and a storage unit 300. The storage unit 300 is configured to store the received emails.

The processing unit 200 includes a reading module 210, a detection module 220, a account setting module 230, and an email receiving module 240. The reading module 210 is configured to read the received emails.

The detection module 220 is configured to detect whether parameters of the read email are consistent with predetermined rules. The parameters can be, but are not limited to, a sender's email address, an email subject, and email content, and so on. The predetermined rules can be pre-stored in the storage unit 300, or can be set in an implementation process of the detection module 220. In the exemplary embodiment, the predetermined rules are that the email subject and/or email content of the read email include a verification code, user name of the origination email account of the read email, and a password of the origination account. The verification code can be a predetermined code or an identification code (ID) of the electronic device 100, and the user name and password can be entered in the body of the email in a predetermined format. In the exemplary embodiment, the detection module 220 detects whether the email subject and/or email content of the read email include the verification code, user name of the origination account of the read email, and password of the origination account to determine whether the parameters of the read email are consistent with the predetermined rules. If the email subject and/or email content of the read email includes the verification code, user name of the origination account of the read email, and password of the origination account, the detection module 220 determines that the parameters of the read email are consistent with the predetermined rules. In this case, the email account settings are changed so that the device 100 logs into the origination account from which the email was received until another email is received that changes the settings again. Until further changes the user can now receive email from his or hers selected email account but will not receive email addressed to the previous account. Otherwise, namely, the parameters of the read email are not consistent with the predetermined rules; the processing unit 200 processes the read email in a general manner. In the exemplary embodiment, the general manner can be, but is not limited to, storing the email, displaying the email, and so on.

In another exemplary embodiment, the predetermined rules can be: the email subject and/or email content of the read email includes a predetermined keyword, the user name of the origination account of the read email, and the password of the origination account. The detection module 220 detects whether the email subject and/or email content of the read email includes the predetermined keyword, the user name of the origination account of the read email, and the password of the origination account, to determine whether the parameters of the read email are consistent with the predetermined rules.

The account setting module 230 is configured to set the origination email account, which sent the read email, as an available email account of the electronic device 100 if the parameters of the read email are consistent with the predetermined rules. For example, if a current account 30 of the electronic device 100 is A@126.com, the A@126.com account 30 of the electronic device 100 receives an email sent from a b@sina.com account, and the parameters of the email from the b@sina.com account are consistent with the predetermined rules, the account setting module 230 sets the b@sina.com account as the current available account 30 of the electronic device 100. In another exemplary embodiment, the account setting module 230 further sets the original available account (i.e., A@126.com) of the electronic device as an unavailable account.

The email receiving module 240 is configured to receive emails via the available email account 30 of the electronic device 100.

Figure 3:
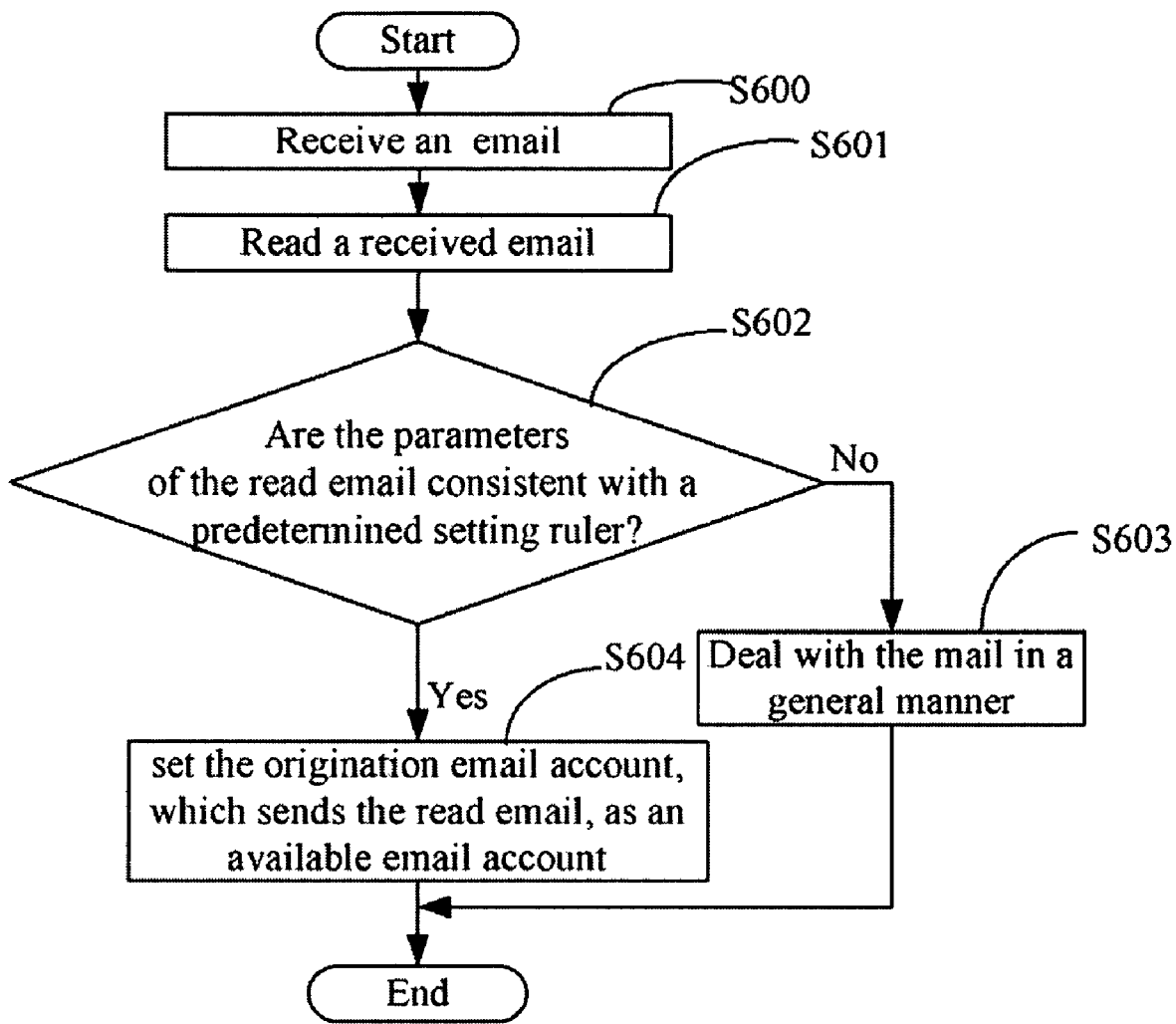
FIG. 3 is a flowchart of a method for setting a account to a different email account implemented by the electronic device of FIG. 2 in accordance with an exemplary embodiment.

FIG. 3 is a flowchart of a method for setting a account to a different email account implemented by the electronic device 100 of FIG. 2 in accordance with an exemplary embodiment.

In step S600, the email receiving module 240 receives emails via the available email account 30 of the electronic device 100.

In step S601, the reading module 210 reads the received emails.

In step S602, the detection module 220 detects whether the parameters of the read email are consistent with the predetermined rulers.

In step S603, the processing unit 200 deals with the email in the general manner if the parameters of the read email are not consistent with the predetermined rules.

If the parameters of the read email are consistent with the predetermined rules, in step S604, the account setting module 230 sets the email account, which sends the read email, as an available email account of the electronic device 100. The account setting module 230 further sets the original available email account 30 of the electronic device 100 as an unavailable email account. The email receiving module 240 receives emails via the available email account of the electronic device 100.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device with an email function, wherein the electronic device accesses and receives emails from a predetermined email account, the electronic device comprising:
   a storage unit capable of storing emails; and
   a processing unit executed by a processor comprising:
   an email receiving module capable of receiving emails sent from an original email account via the predetermined email account;
   a reading module capable of reading the received emails;
   a detection module capable of detecting whether parameters of a read email are consistent with predetermined rules; and
   an account setting module capable of changing the predetermined email account to the original email account when the parameters of the read email satisfy the predetermined rules;
   wherein the parameters of the email comprise an email subject and an email content, the detection module is capable of detecting whether the email subject or email content of the read email comprises a verification code, a user name of the original email account of the read email, and a password of the original email account, to determine whether the parameters of the read email are consistent with the predetermined rules; and
   the account setting module is further capable of setting the predetermined email account of the electronic device as an unavailable email account.

2. The electronic device as in claim 1, wherein the detection module is further capable of detecting whether the email subject or email content of the read email comprise a predetermined keyword, to determine whether the parameters of the read email are consistent with the predetermined rules.

3. The electronic device as in claim 1, wherein the verification code is a predetermined code or an identification code (ID) of the electronic device.

4. A method for setting an email account of an electronic device, wherein the electronic device accesses and receives emails from a predetermined email account, comprising:
   receiving emails sent from an original email account;
   reading a received email;
   detecting whether parameters of the read email are consistent with predetermined rules; and
   changing the predetermined email account to the original email account when the parameters of the read email are consistent with the predetermined rules;
   wherein the parameters of the email comprise an email subject, and email content, the detecting step further comprising:
   detecting whether the email subject or email content of the read email comprises a verification code, a user name of the original account of the read email, and a password of the original email account, to determine whether the parameters of the read email are consistent with the predetermined rules; and
   setting the predetermined email account of the electronic device as an unavailable email account.

5. The method as described in claim 4, wherein the detection step further comprises:
   detecting whether the email subject or email content of the read email comprises the predetermined keyword, to determine whether the parameters of the read email are consistent with the predetermined rules.

6. The method as described in claim 4, wherein the verification code is a predetermined code or an identification code (ID) of the electronic device.

* * * * *